(12) United States Patent
Lin (10) Patent No.: US 10,829,141 B2
(45) Date of Patent: Nov. 10, 2020

(54) TRAILER FOR STROLLER (71) Applicant: ZHONGSHAN AIFUBAO DAILY PRODUCTS CO., LTD., Zhongshan (CN)

(72) Inventor: Chao Hsi Lin, Zhongshan (CN)

(73) Assignee: ZHONGSHAN AIFUBAO DAILY PRODUCTS CO., LTD., Zhongshan (CN)

( * ) Notice: Subject to any disclaimer, the term of this patent is extended or adjusted under 35 U.S.C. 154(b) by 0 days.

(21) Appl. No.: 16/378,637

(22) Filed: Apr. 9, 2019

(65) Prior Publication Data
US 2020/0010107 A1    Jan. 9, 2020

(30) Foreign Application Priority Data

Jul. 3, 2018 (CN) .......................... 2018 1 0718009
Sep. 26, 2018 (CN) .......................... 2018 2 1575586

(51) Int. Cl.
*B62B 7/10* (2006.01)
*B62B 9/28* (2006.01)
(Continued)

(52) U.S. Cl.
CPC .............. *B62B 7/105* (2013.01); *B62B 9/28* (2013.01); *B62B 3/022* (2013.01); *B62B 5/065* (2013.01);
(Continued)

(58) Field of Classification Search
CPC .. B62B 9/28; B62B 3/022; B62B 7/06; B62B 7/062; B62B 7/068; B62B 7/14; B62B 7/142
See application file for complete search history.

(56) References Cited

U.S. PATENT DOCUMENTS 3,848,884 A * 11/1974 Lines ...................... B62B 7/068
280/644
7,694,996 B2 * 4/2010 Saville .................... B62B 7/062
280/47.38
(Continued)

FOREIGN PATENT DOCUMENTS

CN    202 624 314 U    12/2012
DE    203 13 208 U1    10/2003
(Continued)

OTHER PUBLICATIONS

Dec. 6, 2018 International Search Report issued in International Patent Application No. PCT/CN2018/099410.
(Continued)

*Primary Examiner* — Erez Gurari
(74) *Attorney, Agent, or Firm* — Oliff PLC (57) ABSTRACT

Trailer for stroller includes a wheel frame with a lifting seat, and a push rod capable of sliding along the movement direction of front and rear wheels, which can be folded between the wheel frame and the seat. The push rod drives the seat to rise and fall; and a locking structure used for locking the push rod to limit the slide of the push rod when the seat rises is disposed between the push rod and the wheel frame. The seat is driven to rise when the push rod slides and is pulled up, and the seat is driven to fall when the push rod slides and is retracted; and the locking structure ensures the stability of the seat.

17 Claims, 13 Drawing Sheets

(51) Int. Cl.
  *B62B 3/02* (2006.01)
  *B62B 5/06* (2006.01)
  *B62B 7/04* (2006.01)
  *B62B 7/12* (2006.01)

(52) U.S. Cl.
  CPC .............. *B62B 5/067* (2013.01); *B62B 7/042* (2013.01); *B62B 7/12* (2013.01)

(56) References Cited

U.S. PATENT DOCUMENTS

| | | | | |
|---|---|---|---|---|
| 9,428,208 | B1* | 8/2016 | Chen | B62B 9/18 |
| 2011/0278823 | A1* | 11/2011 | Lai | B62B 5/087 |
| | | | | 280/504 |
| 2013/0087993 | A1* | 4/2013 | Jacquet | A47D 1/004 |
| | | | | 280/647 |
| 2013/0087994 | A1* | 4/2013 | Pratt | B62B 3/02 |
| | | | | 280/651 |
| 2013/0093165 | A1* | 4/2013 | Liao | B62B 3/02 |
| | | | | 280/651 |
| 2013/0168947 | A1* | 7/2013 | Offord | B62B 7/142 |
| | | | | 280/658 |
| 2014/0332299 | A1* | 11/2014 | Rauch | B62B 3/02 |
| | | | | 180/208 |
| 2015/0048599 | A1* | 2/2015 | Liu | B62B 7/145 |
| | | | | 280/642 |
| 2015/0266494 | A1* | 9/2015 | Weber | B62B 9/28 |
| | | | | 280/650 |
| 2016/0229439 | A1* | 8/2016 | Zhong | B62B 7/008 |
| 2016/0297459 | A1* | 10/2016 | Opsvik | B62K 3/002 |
| 2017/0183024 | A1* | 6/2017 | Liao | B62B 7/086 |
| 2018/0056152 | A1* | 3/2018 | Reimers | B62B 5/0053 |
| 2019/0161105 | A1* | 5/2019 | Baron | B62B 9/28 |
| 2019/0210626 | A1* | 7/2019 | Mazoyer | B62K 9/02 |
| 2019/0217879 | A1* | 7/2019 | Gibson | B62B 7/06 |
| 2019/0367068 | A1* | 12/2019 | Chaudeurge | B62B 5/08 |
| 2020/0010107 | A1* | 1/2020 | Lin | B62B 9/12 |

FOREIGN PATENT DOCUMENTS

| | | |
|---|---|---|
| DE | 10 2005 029448 A1 | 1/2007 |
| DE | 20 2010 000510 U1 | 7/2010 |
| WO | 2015/105395 A1 | 7/2015 |

OTHER PUBLICATIONS

Dec. 6, 2018 Written Opinion issued in International Patent Application No. PCT/CN2018/099410.

Nov. 26, 2019 Search Report issued in European Patent Application No. 19171043.3.

\* cited by examiner

TRAILER FOR STROLLER

TECHNICAL FIELD

The present invention relates to a trailer for stroller.

BACKGROUND ART

In life, if a family has two children close in age, in case of going out, it is inconvenient to take two children strollers, and if only one children stroller is taken, it is difficult to coordinate when both of the younger and older children want to sit in the stroller. Therefore, a plate trailer is proposed, which is hitched to the children stroller, so it is suitable for the older child to stand behind to have a rest and also convenient to carry. However, most of the plate trailers have single function, being not applicable to various needs due to hyperactivity of the children.

SUMMARY OF THE INVENTION

The purpose of this invention is to overcome the defects in the prior art to provide a trailer for stroller available for standing, sitting and individual use.

The present invention is realized through the following technical solutions:

A trailer for stroller, comprising a wheel frame; the wheel frame is provided with a lifting seat and a push rod capable of sliding along the movement direction of front and rear wheels; and the push rod can be folded between the wheel frame and the seat.

In the trailer for stroller, the push rod drives the seat to rise and fall; and a locking structure used for locking the push rod to limit the slide of the push rod when the seat rises is disposed between the push rod and the wheel frame.

In the trailer for stroller, the wheel frame includes a connecting rod/connecting rods for connecting the front and rear wheels; the connecting rod is/the connecting rods are provided with a sliding seat capable of sliding along the connecting rod/rods; and the push rod is hinged with the sliding seat.

In the trailer for stroller, one end of the bottom of the seat is articulated with the free end part of the push rod, and the other end or the middle part of the bottom of the seat is articulated with the middle part of the push rod through a lifting rod.

In the trailer for the stroller, the locking structure includes a positioning pin/positioning pins disposed on the sliding seat; and each connecting rod is provided with at least one locking hole matched with the positioning pin respectively for locking the sliding seat.

In the trailer for the stroller, the sliding seat is provided with a push rod seat connected with the push rod/rods; the push rod seat is hinged with the sliding seat through a hollow hinged shaft, an outer surface of the push rod seat is circumferentially provided with a slot communicated with the inner cavity of the push rod seat and the inner cavity of the hollow hinged shaft, and the positioning pin is in a L shape, is sleeved in the hollow hinged shaft and extends out of the slot.

In the trailer for the stroller, the push rod is a telescopic rod and includes a rod sheath connected with the push rod seat; a telescopic pole is sleeved into the rod sheath; the end of the telescopic rod, which extends into the rod sheath, is provided with an extruding part capable of extruding the positioning pin, and the positioning pin is connected with at least an elastic element capable of resetting the displacement of the positioning pin.

In the trailer for the stroller, the extruding part has a bevel or a curved surface capable of being abutted against the positioning pin.

In the trailer for the stroller, the push rod is provided with an unlocking unit capable of unlocking the limit of the locking structure.

In the trailer for the stroller, the unlocking unit includes an unlocking structure and a linkage element for connecting the unlocking structure and the locking structure.

In the trailer for the stroller, the locking structure includes a base connected with the push rod, a shaft bushing sleeved with the sliding seat penetrates the base; a locking pin/locking pins capable of extending out of one end of the shaft bushing or contracting back into the shaft bushing is sleeved in the shaft bushing; and each connecting rod is provided with a locking hole/locking holes matched with the locking pin/pins for locking the seat to a raised position.

In the trailer for the stroller, the unlocking unit also includes a linkage block/linkage blocks disposed in the base and connected with the linkage element and the locking pin/locking pins; and the linkage block drives/the linkage blocks drive the locking pin/pins out of the locking hole/holes under the linkage of the linkage element.

In the trailer for the stroller, one end of each locking pin, which is away from the corresponding locking hole, is provided with an elastic member that axially presses the locking pin/pins.

In the trailer for the stroller, the shaft bushing has an axial sliding groove/axial sliding grooves; each linkage block is sleeved at the periphery of the shaft bushing; and the linkage block is connected with the locking pin by a pin penetrating through the sliding groove correspondingly, so as to drive the locking pin to move in a stroke of the axial sliding groove.

In the trailer for the stroller, the unlocking structure includes a lifting element disposed on the push rod and connected with the linkage element; the push rod is provided with a fixing element for limiting the lifting element; and an unlocking press member capable of connecting or separating the lifting element and the fixing element is disposed between the lifting element and the fixing element.

In the trailer for the stroller, the seat is provided with a handrail that locally or entirely encircles the seat.

In the trailer for the stroller, the free end of the push rod is provided with a handle; the seat is provided with a handrail opposite to the handle; Further, the handle is disposed at the end of the telescopic pole.

Compared with the prior art, the invention has the following advantages:

This invention has simple structure; the seat is driven to rise when the push rod slides and is pulled up, and the seat is driven to fall when the push rod slides and is retracted so that operation is simple and quick; and the locking structure ensures the stability of the seat rised, thereby realizing safety and reliability.

The invention may be individually used as a stroller and may also be hitched to a frequently-used stroller for use as a trailer. When it is pulled in a folded state, the older child can stand on the seat such that his/her movement up and down is facilitated; and when the older child wants to sit and have a rest, the seat can be lifted and the older child sits on the seat, with his/her back against the push rod or the handle to feel relaxed and comfortable. The invention has a wide application scope.

DETAILED DESCRIPTION OF THE INVENTION

The present invention is further described below in detail in conjunction with the drawings of the description.

As shown in FIGS. 1-5, a trailer for a stroller includes a wheel frame 1; the wheel frame 1 is provided with a lifting seat 2 and a push rod 3 capable of sliding along the movement direction of front and rear wheels; and the push rod 3 can be folded between the wheel frame 1 and the seat 2. When the seat 2 falls to a low position, the seat 2 is close to the wheel frame 1; the push rod 3 is folded between the wheel frame 1 and the seat 2; and older child or a pet can stand on the seat 2. When the seat 2 rises, the push rod 3 can be folded to a push-pull position for the convenience of pushing and pulling the trailer.

Figure 7:
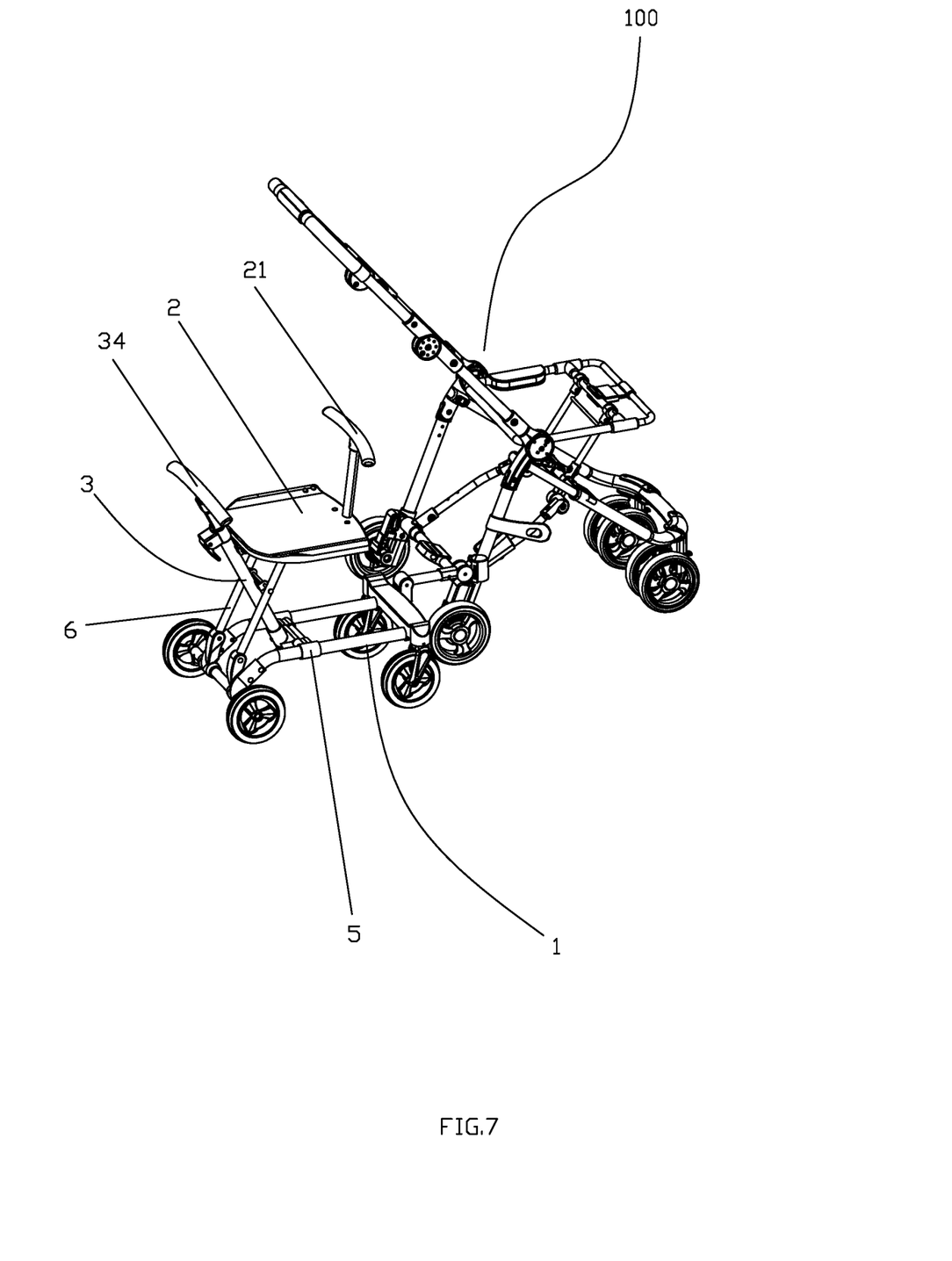
FIG. 7 is a structure diagram of the invention in a trailing state 2.

Preferably, for the sake of safety, the free end of the push rod 3 is provided with a handle 34; and the seat 2 is provided with a handrail 21 opposite to the handle 34. As shown in FIG. 7, when the older child sits on the seat 2, he/she has the handrail 21 in front of him/her to hold and the handle 34 behind him/her to rest his/her back against, so that it's quite safe for the older child and accidental fall is avoided.

Preferably, the push rod 3 drives the seat 2 to rise and fall; the push rod 3 can be folded between the wheel frame 1 and the seat 2 or can rotate and erect in a sliding process; and a locking structure 4 used for locking the push rod 3 to limit the slide of the push rod 3 when the seat 2 rises is disposed between the push rod 3 and the wheel frame 1, thereby ensuring stability and safety of the seat 2.

The wheel frame 1 includes a connecting rod 11/connecting rods 11 for connecting the front and rear wheels; the connecting rod/rods 11 is/are provided with a sliding seat 5 capable of sliding along the connecting rod/rods 11; and the push rod 3 is hinged with the sliding seat 5. The count of the connecting rod 11 may be one or two. To ensure the stability of the seat 2, preferably, two connecting rods 11 are disposed. The wheel frame 1 also includes a front beam 12 connected with a front wheel group and a rear beam 13 connected with a rear wheel group.

Preferably, one end of the bottom of the seat 2 is articulated with the free end part of the push rod 3, and the other end or the middle part of the bottom of the seat 2 is articulated with the middle part of the push rod 3 through a lifting rod 6. One end of the lifting rod 6 is articulated with the seat 2, the middle part is articulated with the push rod 3, and the other end is articulated with the end part of the wheel frame 1 at the same end as the free end of the push rod 3 to form a deformable X-shaped structure together with the push rod 3 to support the seat 2. The wheel group at the same end as the handle 34 is defined as rear wheels, and the lifting rod 6 is articulated with the rear beam 13. Further preferably, the lifting rod 6 is a U-shaped rod, the open end of the U-shaped rod is articulated with the rear beam 13, the closed end of the U-shaped rod is articulated with the bottom of the seat 2, and the middle part of the U-shaped rod is articulated with the middle part of the push rod 3. After the seat 2 falls, the seat 2 just falls above the wheel frame 1.

The locking structure 4 includes a positioning pin/positioning pins 41 disposed on the sliding seat 5; and each connecting rod 11 is provided with at least one locking hole 42 matched with the positioning pin 41 respectively for locking the sliding seat 5.

Preferably, the sliding seat 5 is provided with a push rod seat 8 connected with the push rod 3; the push rod seat 8 is hinged with the sliding seat 5 through a hollow hinged shaft 7; the sliding seat 5 includes sliding sheaths 51 sleeved on the connecting rods 11 and capable of sliding along the connecting rods 11 respectively, a connecting pipe 52 connecting between the sliding sheaths 51, and a sleeve pipe 53/sleeve pipes 53 sleeved on the hollow hinged shaft 7, the connecting pipe 52 is parallel to the sleeve pipe/pipes 53. Preferably, the sliding sheaths 51, the connecting pipe 52 and the sleeve pipe/pipes 53 are integrally formed. The push rod 3 is fixedly connected with the push rod seat 8. An outer surface of the push rod seat 8 is circumferentially provided with a slot 81 communicated with the inner cavity of the push rod seat 8 and the inner cavity of the hollow hinged shaft 7. The axial direction of the hollow hinged shaft 7 is parallel to the axial direction of the sliding seat 5. The positioning pin/pins 41 may be in a L shape, penetrating in the hollow hinged shaft 7 and extending out of the slot 81. The hollow hinged shaft 7 is sleeved in the sleeve pipe 53 of the sliding seat 5. The positioning pin/pins 41 is/are sleeved in the hollow hinged shaft 7, the positioning pin/pins 41 can enter the sliding sheath/sheaths 51 and can be inserted into the locking hole 42. The positioning pin/pins 41 can be manually inserted into the locking hole 42, and can also be manually pulled out to unlock the sliding seat 5 so that the sliding seat 5 can slide.

Figure 1:
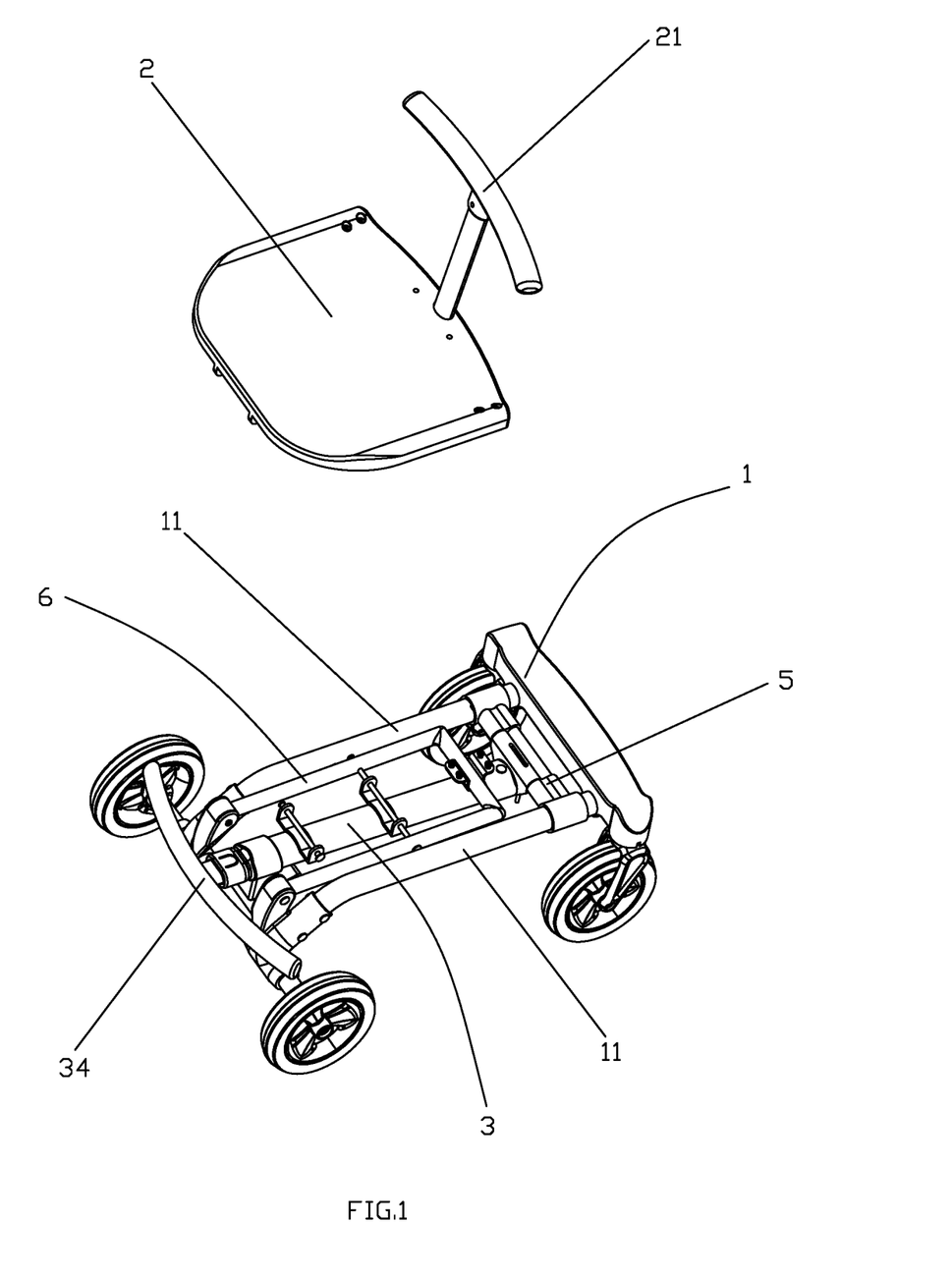
FIG. 1 is an exploded view of the invention in a folded state.
Figure 2:
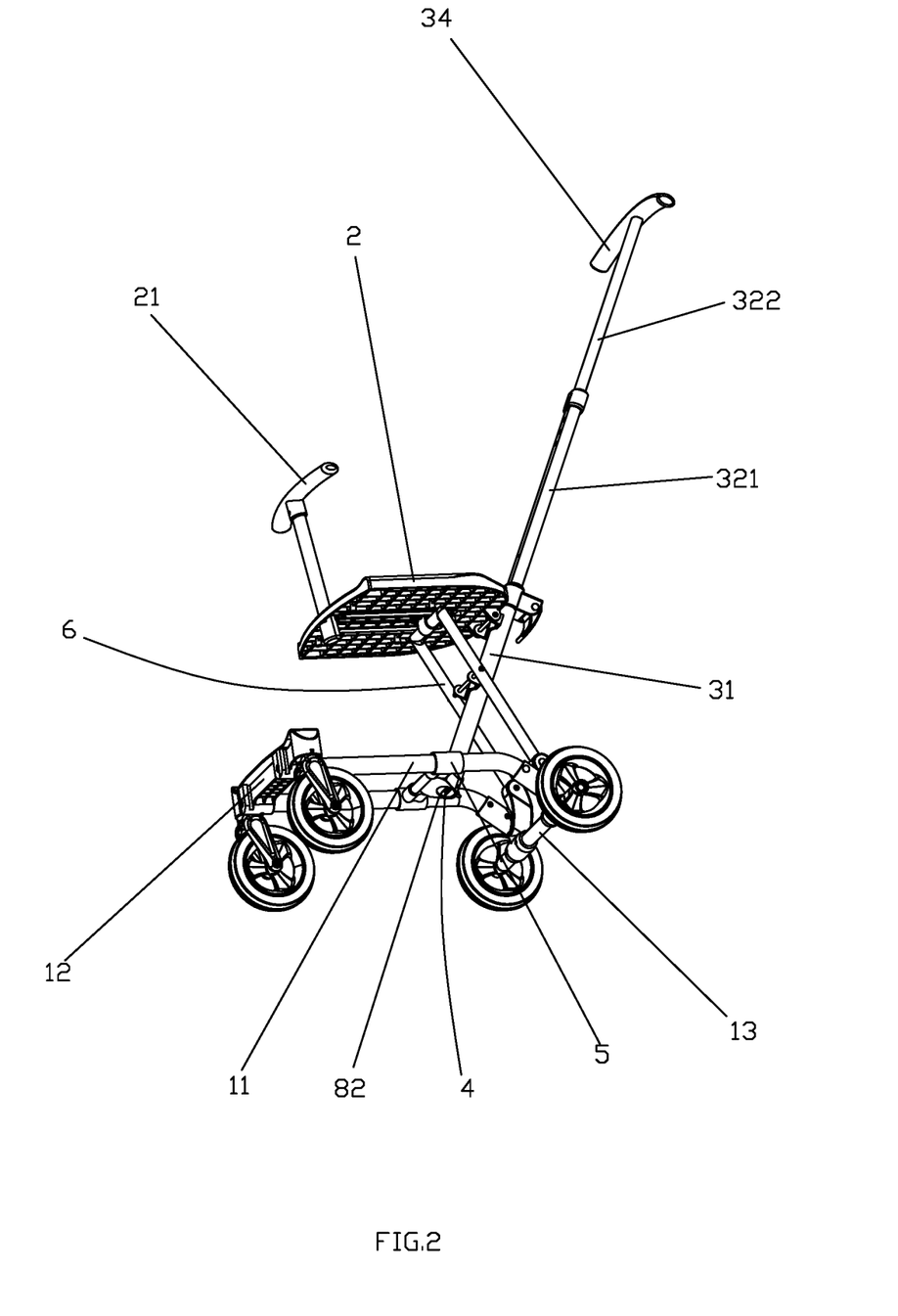
FIG. 2 is a structure diagram of the invention in an unfolded state.
Figure 3:
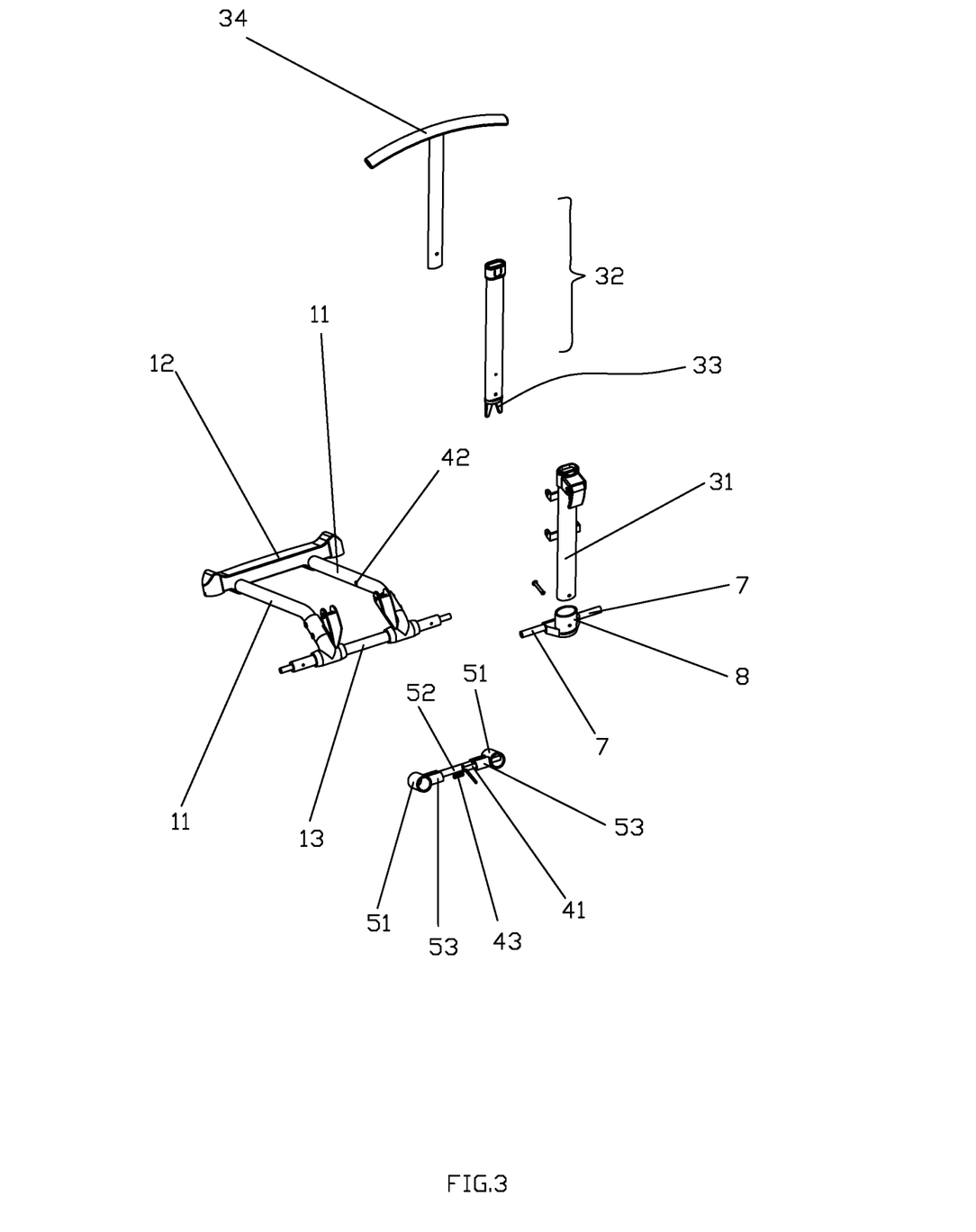
FIG. 3 is an exploded view of the push rod and the wheel frame of the invention.

More preferably, as shown in FIGS. 2-3, the push rod 3 may be telescopic, including a rod sheath 31 connected with the push rod seat 8; the rod sheath 31 is fixedly sleeved in the push rod seat 8; a telescopic rod 32 is sleeved into the rod sheath 31; the end of the telescopic rod 32, which extends into the rod sheath 31, is provided with an extruding part 33 capable of extruding the positioning pin/pins 41; and the positioning pin/pins 41 may be connected with an elastic element 43 capable of resetting the displacement/displacements of the positioning pin/pins 41. The elastic element 43 is preferably disposed in the push rod seat 8, and the extruding part 33 and the telescopic rod 32 can be formed integrally. When the sliding seat 5 slides, the telescopic rod 32 is kept in the rod sheath 31, the extruding part 33 keeps extruding the positioning pin/pins 41 to be away from the connecting rod/rods 11 respectively, the elastic element 43 is compressed; when the sliding seat 5 slides to the position of the locking hole/holes 42, the telescopic rod 32 is pulled out and the extruding part 33 releases the positioning pin/pins 41, the elastic element 43 is reset and extrudes the positioning pin 41 to be inserted into the locking hole 42 correspondingly so as to lock the sliding seat 5 and limit the sliding of the sliding seat 5. The push rod 3 rotates and lifts the seat 2 in a sliding process.

Figure 4:
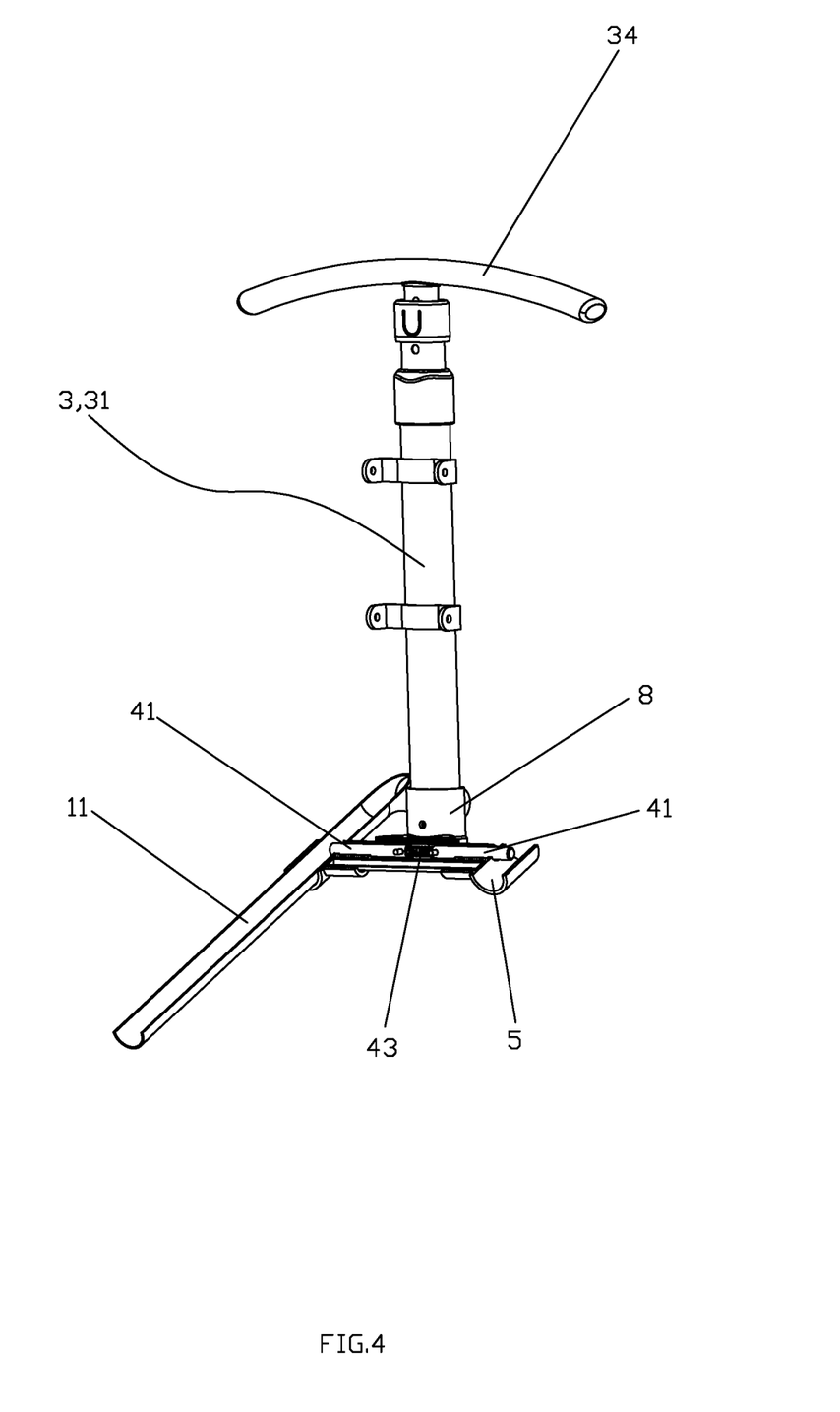
FIG. 4 is a partial sectional view of the locking structure for locking the sliding seat of the invention.

The push rod seat 8 may also be hinged in two sleeve pipes 53 of the sliding seat 5 through two hollow hinged shafts 7, the elastic element 43 is disposed in the push rod seat 8 and positioned between the two hollow hinged shafts 7, capable of resetting the two hollow hinged shafts 7, as shown in FIG. 4.

Even further, a through hole 82 is formed at the axial bottom end, the same direction as the push rod 3, of the push rod seat 8, for the convenience of increasing an extruding stroke of the extruding part 33, the extruding part 33 can penetrate through the through hole 82 and extend out, thereby ensuring an unlocking effect.

The extruding part 33 has bevels or curved surfaces capable of being abutted against the positioning pin/pins 41. When the extruding part 33 rises, the positioning pin/pins 41 can be loosened, and when the extruding part 33 falls, the positioning pin/pins 41 can be extruded. The extruding part 33 is preferably wedge-shaped.

When the push rod 3 is telescopic, a handle 34 is disposed at the free end of the telescopic rod 32; and the seat 2 is provided with a handrail 21 opposite to the handle 34. Further, the telescopic rod 32 includes a first telescopic rod 321 and a second telescopic rod 322 from outside to inside. The handle 34 is disposed on the second telescopic rod 322 at an upper stretching end. The extruding part 33 is disposed at the lower end of the lower first telescopic rod 321. Locking units are disposed between the rod sheath 31 and the telescopic rod 32, between the first telescopic rod 321 and the second telescopic rod 322 seperately for fixing a telescopic state.

Figure 5:
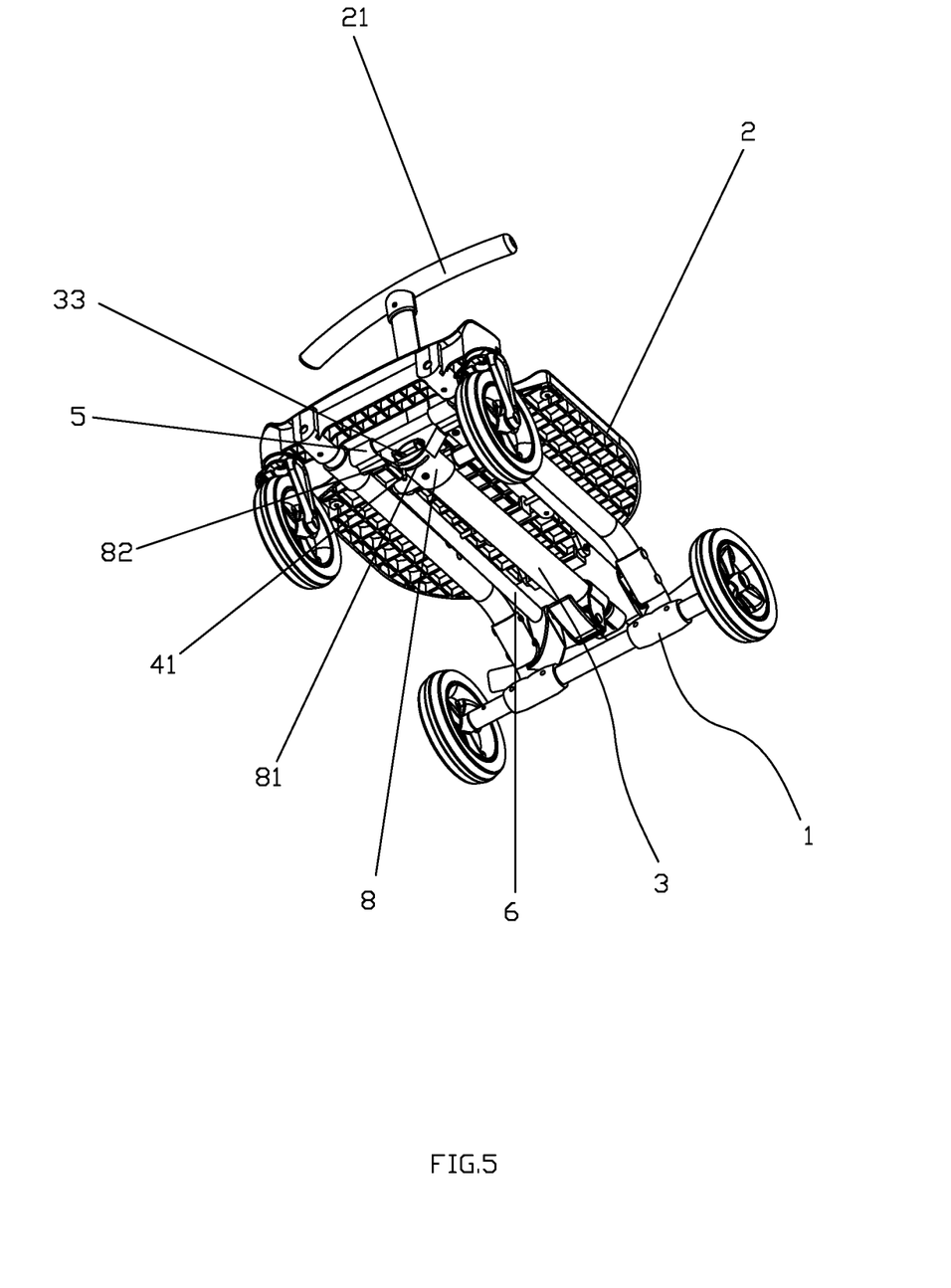
FIG. 5 is a structure diagram of the invention in a folded state.

When the seat 2 is in the low position, the sliding seat 5 is positioned at one end opposite to the free end of the push rod 3, the push rod 3 is folded between the wheel frame 1 and the seat 2, the extruding part 33 extends out of the through hole 82 to extrude the positioning pin 41 so that the positioning pin 41 is in an unlocked state (as shown in FIG. 5). When the seat 2 needs to be lifted, the push rod 3 is pulled to slide, and meanwhile, rotating the push rod 3 to lift the seat 2, when the sliding seat 5 slides to the other end, the positioning pin 41 is aligned with the locking hole 42 respectively, the telescopic rod 32 is unlocked and pulled out, the extruding part 33 rises and is out of contact with the positioning pin 41. The positioning pin 41 is unlocked, and the spring is reset, pushing the positioning pin 41 to be inserted into the locking hole 42 correspondingly so as to fix the position of the sliding seat 5, preventing the seat 2 from falling. During falling, the telescopic rod 32 is unlocked and pushed down so that the extruding part 33 extrudes the positioning pin 41 out of the locking hole 42 so as to slide the push rod 3 to make the seat 2 decline and the push rod 3 is folded between the seat 2 and the wheel frame 1.

As shown in FIGS. 8-12, in another embodiment of the invention, the push rod 3 is provided with an unlocking unit 9 capable of unlocking the limit of the locking structure 4.

Preferably, the unlocking unit 9 includes an unlocking structure 91 and a linkage element 92 for connecting the unlocking structure 91 and the locking structure 4. More preferably, the linkage element 92 is singular or plural linkage rope or singular or plural linkage rod.

Further, the push rod 3 is rotatably connected with the sliding seat 5 through the locking structure 4. The locking structure 4 includes a base 44 connected with the push rod 3; a shaft bushing 45 sleeved with the sliding seat 5, penetrating the base 44; the shaft bushing 45 can rotate in the sliding seat 5 to realize rotation of the push rod 3. A locking pin 46/locking pins 46 capable of extending out of one end of the shaft bushing 45 or contracting back into the shaft bushing 45 is sleeved in the shaft bushing 45; the connecting rod/rods 11 is/are provided with locking holes to match with the locking pin/pins 46 correspondingly for locking the seat 2 to a lifted position (the locking holes is not shown in the FIG. 8-12, but the positions of the locking holes may be same with the positions of the locking holes 42 in the first embodiment). The locking structure 4 can ensure the stability of the seat 2 in the raised position. The inner cavity of the shaft bushing 45 is communicated with the interior of the sliding seat 5, when the locking holes are positioned in the sliding seat 5 and communicated with the inner cavity of the shaft bushing 45, the locking hole can be aligned to the locking pin/pins 46 correspondingly.

The unlocking unit 9 further includes a linkage block 93/linkage blocks 93 disposed in the base 44 and connected with the linkage element 92 and the locking pin/pins 46; and the linkage block 93/blocks 93 can drive the locking pin/pins 46 out of the locking holes under the linkage of the linkage element 92, thereby realizing unlocking and sliding limit for the push rod 3. Arrangement of the linkage block 93/blocks 93 is favorable for installation of the linkage element 92, and is also favorable for the stability of axial movement of the locking pin/pins 46, thereby reducing obstruction and loss caused by deviation of the stroke of the locking pin/pins 46.

The unlocking structure 91 includes a lifting element 911 disposed on the push rod 3 and connected with the linkage element 92; the push rod 3 is provided with a fixing element 912 for limiting the lifting element 911; and an unlocking press member 913 capable of enabling the lifting element 911 and the fixing element 912 to be connected and separated is disposed between the lifting element 911 and the fixing element 912. One end of the unlocking press member 913 extends into the lifting element 911 and can extend out of the outer peripheral surface of the lifting element 911 to form a button end 9131, the other end is an inverted T-shaped limiting end 9132 extending into the fixing element 912, and unlocking grooves 9121 and locking grooves 9122 which are communicated with each other correspondingly are disposed in the fixing element 912, the length of the unlocking groove 9121 is larger than that of the locking groove 9122. Preferably, the stroke of the limiting end 9132 of the unlocking press member 913 in the unlocking grooves 9121 is not smaller than the length of inserting the locking pin 46 into the locking hole. More preferably, a resetting element 914 that facilitates the resetting of the unlocking press member 913 is disposed between the unlocking press member 913 and the lifting element 911. The resetting element 914 may be a reed or a spring that applies a reaction force to the unlocking press member 913.

Further, one end of the locking pin 46, which is away from the corresponding locking hole, is provided with an elastic member 47 that axially presses the locking pin/pins 46, so as to facilitate automatic resetting of the locking pin/pins 46 in a next slide to the locking hole/holes, so that the locking pin/pins 46 is/are inserted into the locking hole/holes respectively to lock the push rod 3. The elastic member 47 is preferably a spring.

Preferably, the shaft bushing 45 has at least an axial sliding groove 451; the linkage block/blocks 93 is/are sleeved at the periphery of the shaft bushing 45; and the linkage block/blocks 93 is/are connected with the locking pin/pins 46 by a pin 94 penetrating the axial sliding groove 451, so as to drive the locking pin/pins 46 to move in the stroke of the axial sliding groove 451. Even further, the length of the axial sliding groove 451 is consistent with the length of the stroke of the unlocking press member 913 in the unlocking groove 9121, thereby avoiding causing hard damage to the sliding seat 5 and the elastic member 47 due to excessive displacement of the locking pin/pins 46.

Even further, in a preferred embodiment, when two connecting rods 11 are disposed, two sliding seats 5 and two locking holes are respectively disposed. Two locking pins 46 are correspondingly disposed on both ends of the shaft bushing 45. The elastic member 47 is disposed between the two locking pins 46. The locking holes are respectively disposed at the inner side of each connecting rod 11. The locking pins 46 are disposed between the two connecting rods 11. When one connecting rod 11 is disposed, the locking holes are respectively disposed on two outer sides of the connecting rod 11. The two locking pins 46 are matched with the locking holes from the outer sides to lock the push rod 3.

Figure 8:
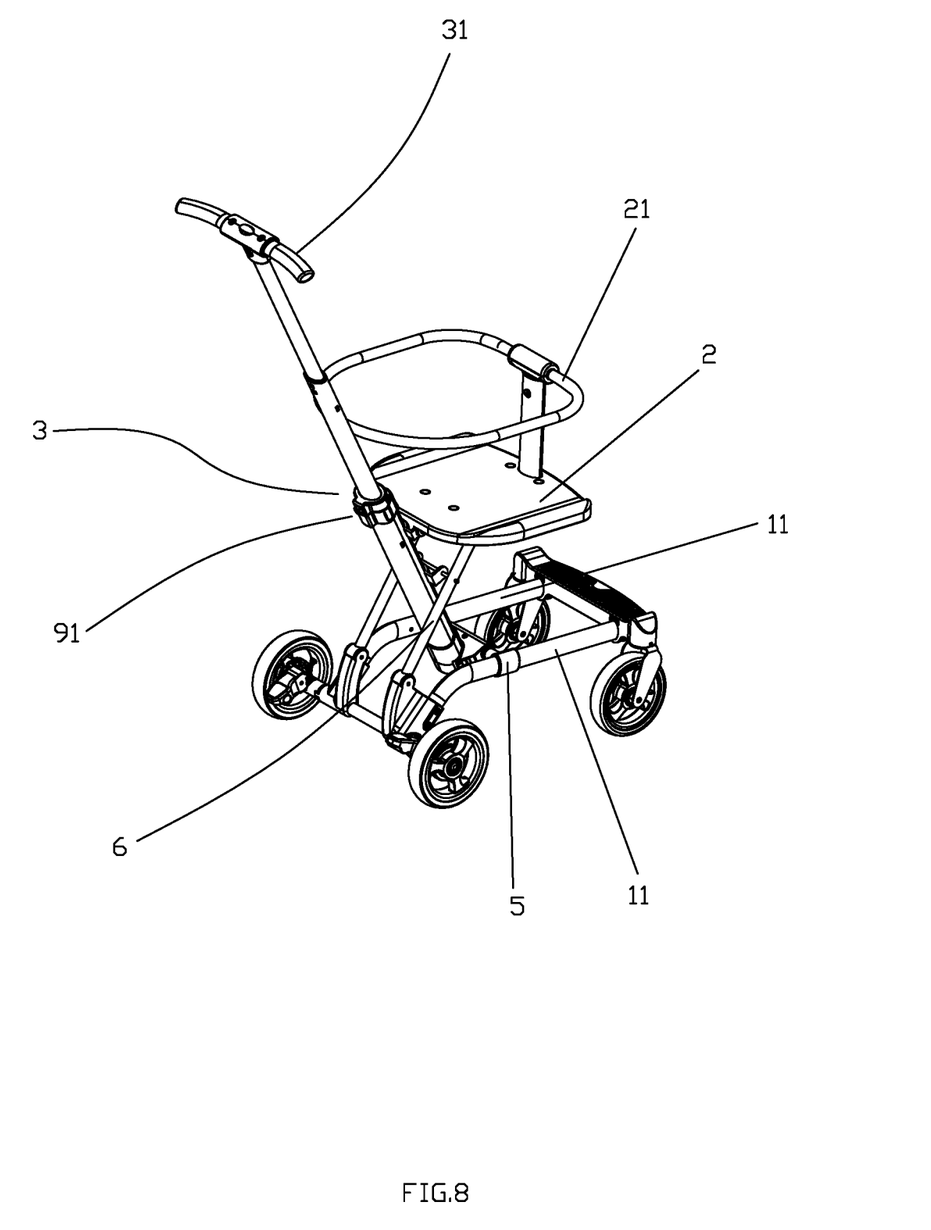
FIG. 8 is a structure diagram of another embodiment of the invention.
Figure 9:
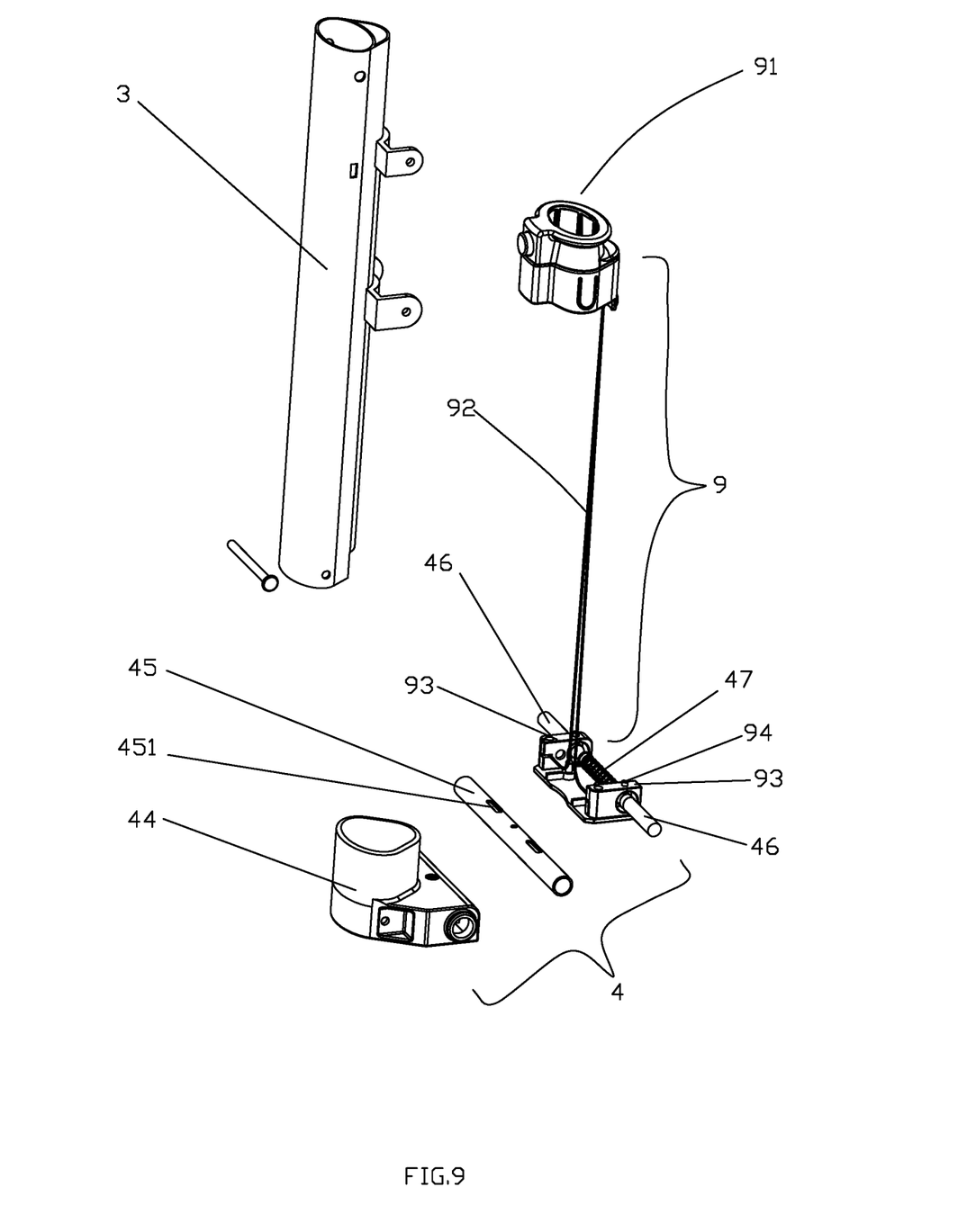
FIG. 9 is an exploded view 1 of a partial structure of another embodiment of the invention.
Figure 10:
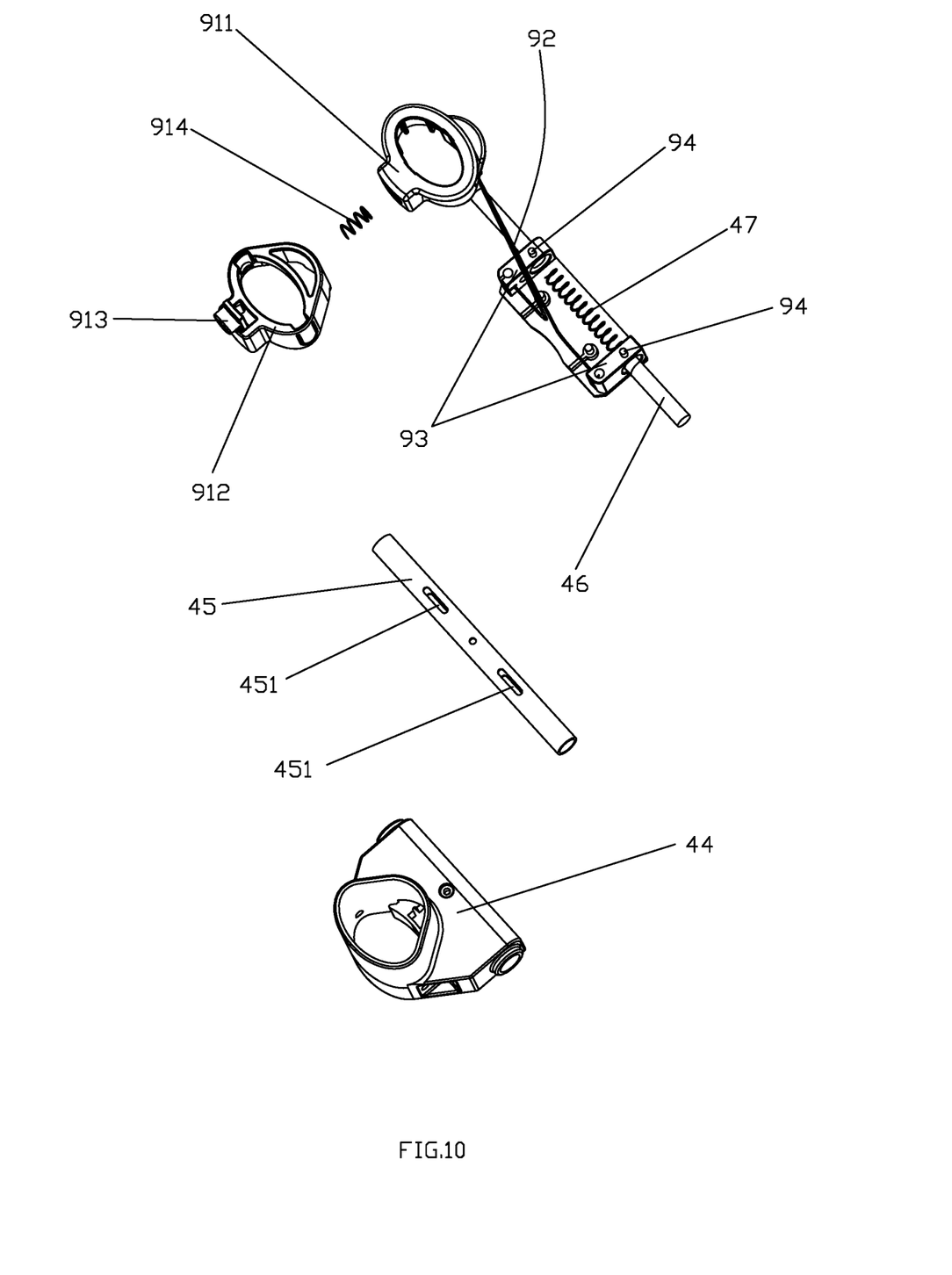
FIG. 10 is an exploded view 2 of a partial structure of another embodiment of the invention.
Figure 11:
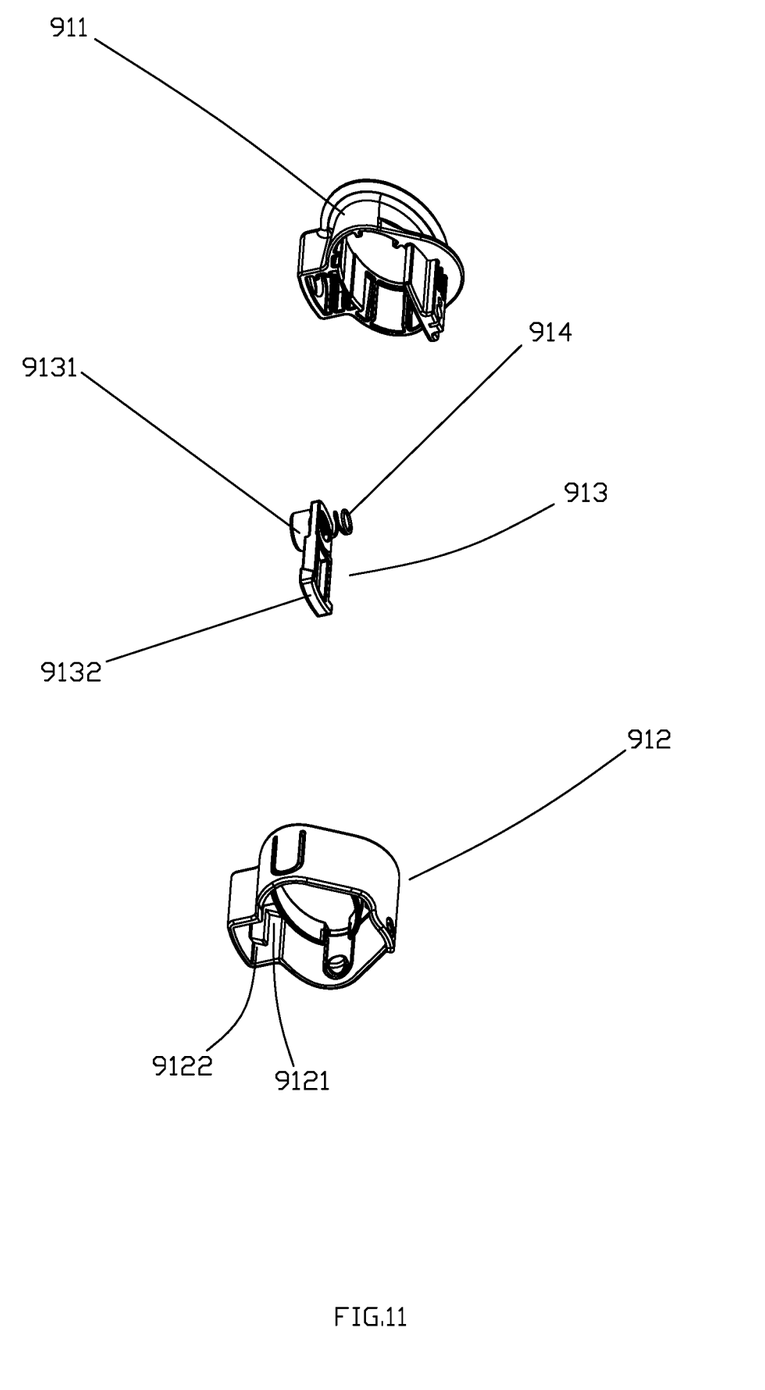
FIG. 11 is an exploded view of the unlocking structure of another embodiment of the invention.
Figure 12:
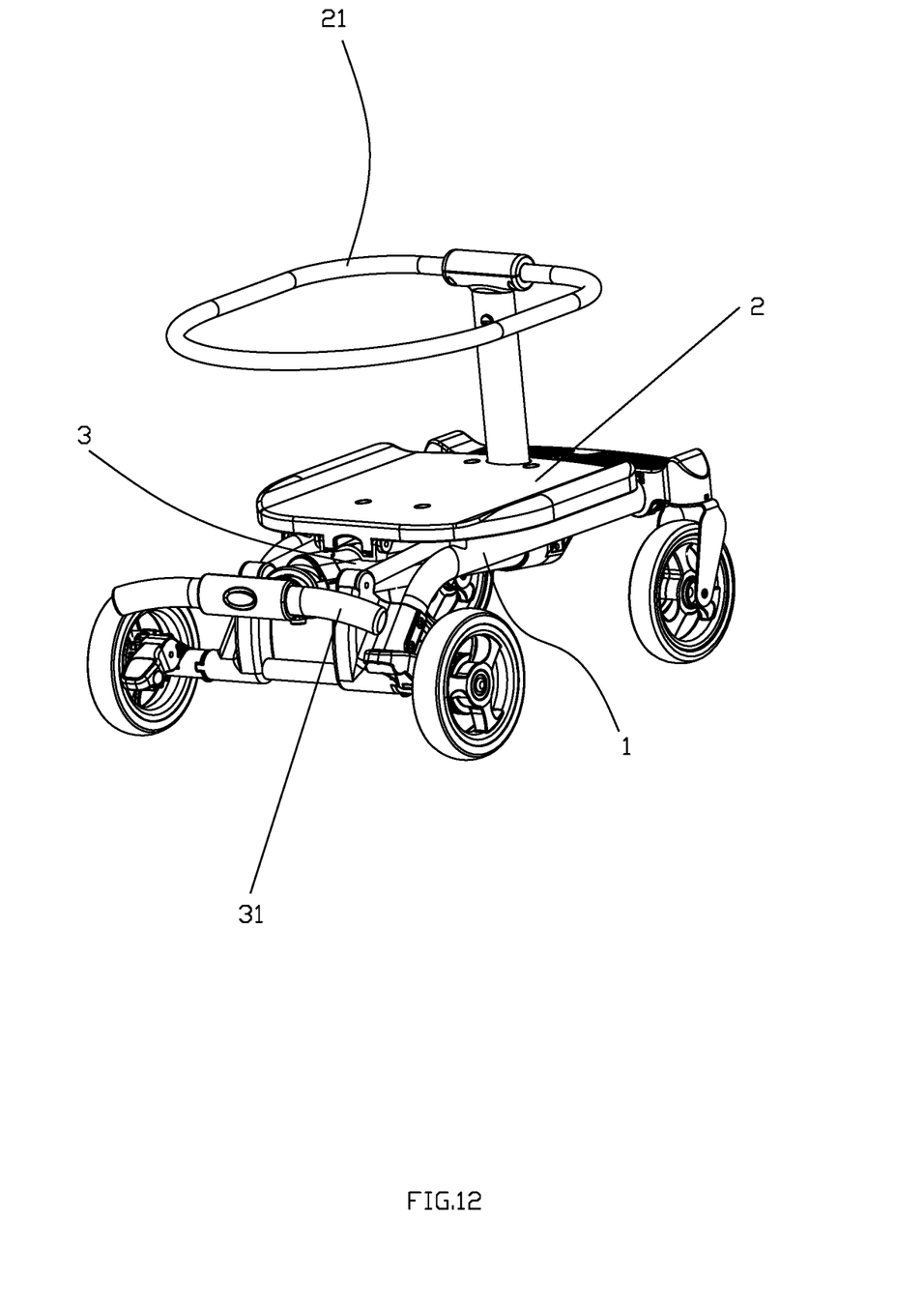
FIG. 12 is a structural view of another embodiment of the invention in a folded state.
Figure 13:
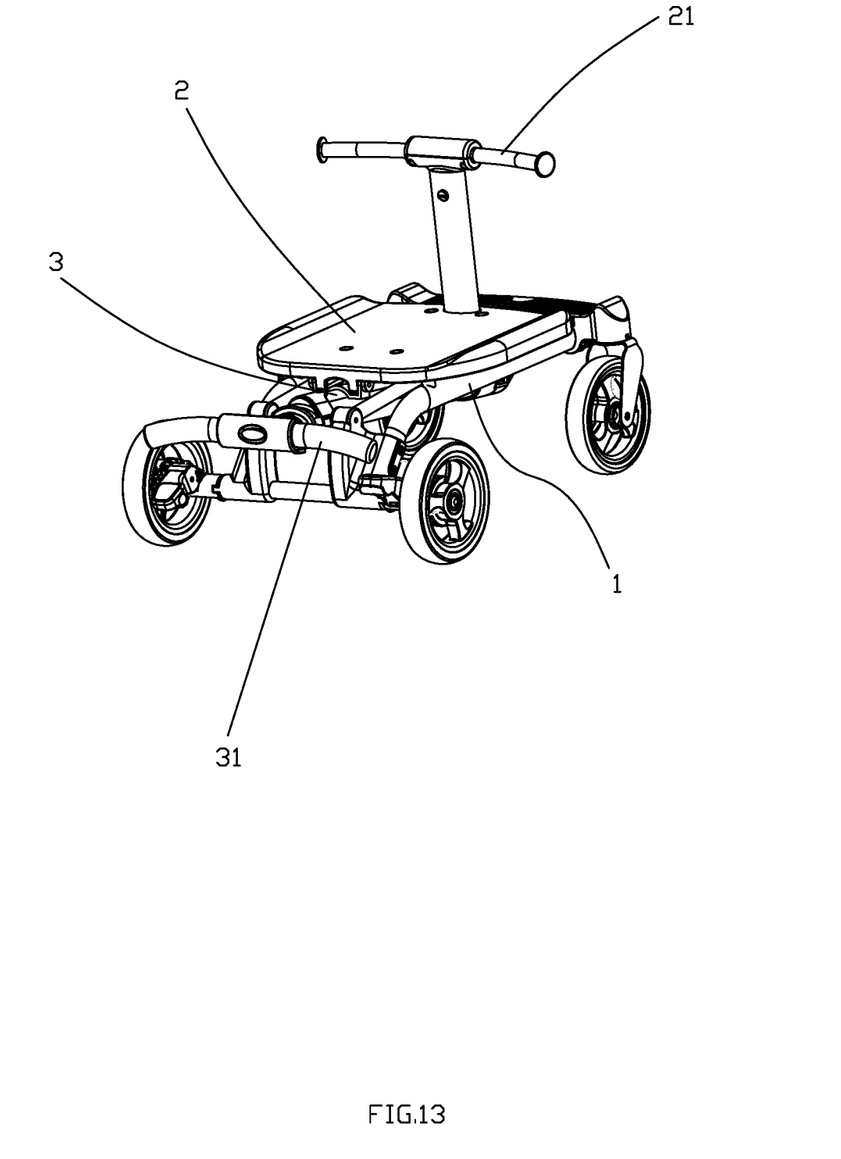
FIG. 13 is a structural view of a third embodiment of the invention in a folded state.

Further, the push rod 3 is telescopic; a handle 34 is disposed at the free end of the push rod 3; and the seat 2 is provided with a handrail 21 that locally or entirely encircles the seat 2. As shown in FIG. 8 and FIG. 12, when the handrail 21 entirely encircles the seat, a safety factor is better, which is suitable for small children. When the handrail 21 locally encircles the seat 2, like the first embodiment, the handrail 21 is opposite to the handle 34, as shown in FIG. 13. In this way, after the older child sit on the seat 2, the handrail 21 is in front of the older child and the handle 34 is behind the older child and acts as a backrest so that the older child are safe and difficult to fall.

In this embodiment, when the seat 2 is in the low position, the sliding seat 5 is positioned at the front end of the wheel frame 1; the push rod 3 is folded between the wheel frame 1 and the seat 2; and the locking pins 46 are abutted against the outer peripheral surface of the connecting rod 11 in the sliding seat 5 and are in an unlocked state. When the seat 2 needs to be lifted, the push rod 3 is pulled to slide, and rotates to lift the seat 2. When the sliding seat 5 slides to the other end, the locking pins 46 are aligned with the locking holes, under the effect of the elastic member 47, the locking pins 46 are inserted into the locking holes seperately and locked so as to stop sliding and fix the position of the sliding seat 5, thereby preventing the seat 2 from falling. When the seat 2 needs to fall, the unlocking press member 913 is pressed so that the lifting element 911 can be separated from the fixing element 912, the lifting element 911 is pulled slidly upwards, so as to pull the linkage element 92 and the linkage block/blocks 93 and drive the locking pins 46 to contract back and separate from the locking holes, thereby realizing unlocking. In this way, the push rod 3 can slide to decline the seat 2, and the push rod 3 is folded between the seat 2 and the wheel frame 1.

Figure 6:
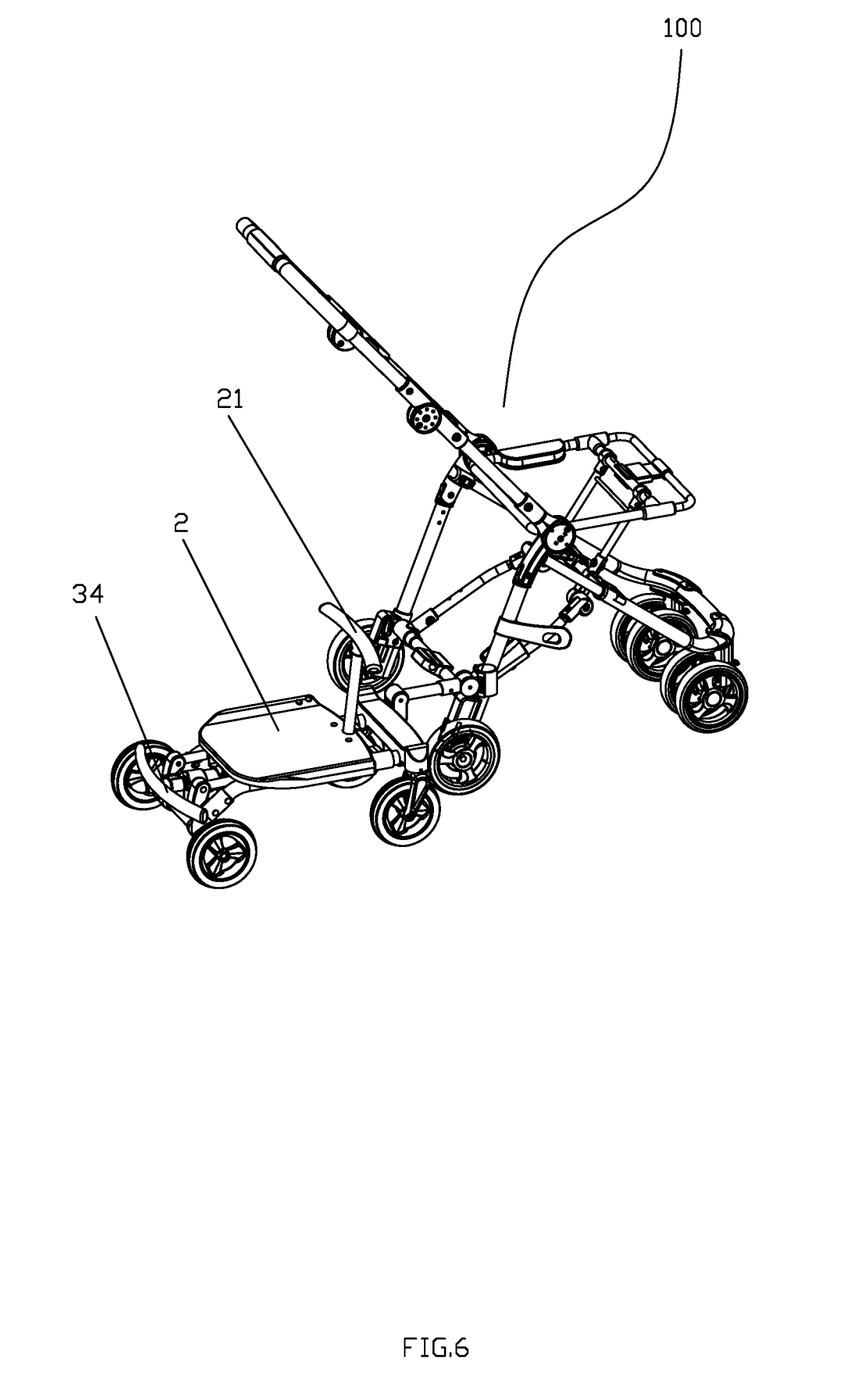
FIG. 6 is a structure diagram of the invention in a trailing state 1.

The trailer for the stroller in this invention can be used individually, as shown in FIG. 2 and FIG. 8. As a walking stroller for the older child, the trailer for the stroller can also be hitched to a stroller 100 through an auxiliary means such as a connector or a rope and then is used, as shown in FIG. 6, when the trailer is hitched to the stroller 100 in a folded state, the younger child can sit in the stroller 100 and the older child can stand on the seat 2. When the trailer with the lifted seat 2 is hitched to the stroller 100, the older child can sit on the seat 2, with his/her back against the handle 34 and hold the handrail 21, feeling relaxed, comfortable and safe, as shown in FIG. 7.

What is claimed is:

1. A trailer for a stroller, the trailer comprising:
   a wheel frame, the wheel frame provided with a lifting seat and a push rod capable of sliding along the movement direction of front and rear wheels,
   wherein the push rod can be folded between the wheel frame and the seat, and
   wherein the push rod drives the seat to rise and fall, and
   wherein a locking structure used for locking the push rod to limit the slide of the push rod when the seat rises is disposed between the push rod and the wheel frame.

2. The trailer for a stroller according to claim 1,
   wherein the wheel frame includes a connecting rod/connecting rods for connecting the front and rear wheels,
   wherein the connecting rod is/the connecting rods are provided with a sliding seat capable of sliding along the connecting rod/rods, and
   wherein the push rod is hinged with the sliding seat.

3. The trailer for a stroller according to claim 2, wherein one end of the bottom of the seat is articulated with the free end part of the push rod, and the other end or the middle part of the bottom of the seat is articulated with the middle part of the push rod through a lifting rod.

4. The trailer for a stroller according to claim 3, wherein the locking structure includes a positioning pin/positioning pins disposed on the sliding seat, and wherein each connecting rod is provided with at least one locking hole matched with the positioning pin respectively for locking the sliding seat.

5. The trailer for a stroller according to claim 4, wherein the sliding seat is provided with a push rod seat connected with the push rod/rods; the push rod seat is hinged with the sliding seat through a hollow hinged shaft, an outer surface of the push rod seat is circumferentially provided with a slot communicated with the inner cavity of the push rod seat and the inner cavity of the hollow hinged shaft, and the positioning pin is in a L shape, is sleeved in the hollow hinged shaft and extends out of the slot.

6. The trailer for a stroller according to claim 5,
   wherein the push rod is a telescopic rod and includes a rod sheath connected with the push rod seat,
   wherein a telescopic pole is sleeved into the rod sheath, and
   wherein the end of the telescopic rod, which extends into the rod sheath, is provided with an extruding part capable of extruding the positioning pin, and the positioning pin is connected with at least an elastic element capable of resetting the displacement of the positioning pin.

7. The trailer for a stroller according to claim 6, wherein the extruding part has a bevel or a curved surface capable of being abutted against the positioning pin.

8. The trailer for a stroller according to claim 1, wherein a free end of the push rod is provided with a handle, and the seat is provided with a handrail opposite to the handle.

9. The trailer for a stroller according to claim 2, wherein the push rod is provided with an unlocking unit capable of unlocking the limit of the locking structure.

10. The trailer for a stroller according to claim 9, wherein the unlocking unit includes an unlocking structure and a linkage element for connecting the unlocking structure and the locking structure.

11. The trailer for stroller according to claim 10,
wherein the locking structure includes a base connected with the push rod, a shaft bushing sleeved with the sliding seat penetrates the base,
wherein a locking pin/locking pins capable of extending out of one end of the shaft bushing or contracting back into the shaft bushing is sleeved in the shaft bushing; bushing, and
wherein each connecting rod is provided with a locking hole/locking holes matched with the locking pin/pins for locking the seat to a raised position.

12. The trailer for a stroller according to claim 11, wherein the unlocking unit also includes a linkage block/linkage blocks disposed in the base and connected with the linkage element and the locking pin/locking pins, and wherein the linkage block drives/the linkage blocks drive the locking pin/pins out of the locking hole/holes under the linkage of the linkage element.

13. The trailer for a stroller according to claim 11, wherein one end of each locking pin, which is away from the corresponding locking hole, is provided with an elastic member that axially presses the locking pin/pins.

14. The trailer for a stroller according to claim 12,
wherein the shaft bushing has an axial sliding groove/axial sliding grooves,
wherein each linkage block is sleeved at the periphery of the shaft bushing, and
wherein the linkage block is connected with the locking pin by a pin penetrating through the sliding groove correspondingly, so as to drive the locking pin to move in the stroke of the axial sliding groove.

15. The trailer for a stroller according to claim 10,
wherein the unlocking structure includes a lifting element disposed on the push rod and connected with the linkage element,
wherein the push rod is provided with a fixing element for limiting the lifting element, and
wherein an unlocking press member capable of connecting or separating the lifting element and the fixing element is disposed between the lifting element and the fixing element.

16. The trailer for a stroller according to claim 1, wherein the seat is provided with a handrail that locally or entirely encircles the seat.

17. The trailer for a stroller according to claim 12, wherein one end of each locking pin, which is away from the corresponding locking hole, is provided with an elastic member that axially presses the locking pin/pins.

\* \* \* \* \*